United States Patent
Hunukumbure et al.

(10) Patent No.: US 8,805,385 B2
(45) Date of Patent: Aug. 12, 2014

(54) HANDOVER PROCEDURES AND SIGNALLING FOR PLANNED CELL OUTAGE IN WIRELESS CELLULAR NETWORKS

(71) Applicant: Fujitsu Limited, Kawasaki (JP)

(72) Inventors: Rajaguru Hunukumbure, Hillingdon (GB); Luciano Pietro Giacomo Sarperi, Bern (CH); Sunil Vadgama, Ashford Middlesex (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/682,265

(22) Filed: Nov. 20, 2012

(65) Prior Publication Data

US 2013/0130690 A1 May 23, 2013

Related U.S. Application Data

(63) Continuation of application No. PCT/GB2010/001134, filed on Jun. 9, 2010.

(51) Int. Cl.
*H04W 40/00* (2009.01)
*H04W 16/10* (2009.01)
*H04W 72/04* (2009.01)
*H04W 72/12* (2009.01)
*H04W 16/02* (2009.01)
*H04W 36/08* (2009.01)

(52) U.S. Cl.
CPC .......... *H04W 72/0453* (2013.01); *H04W 16/10* (2013.01); *H04W 72/1231* (2013.01); *H04W 16/02* (2013.01); *H04W 36/08* (2013.01)
USPC ........... 455/447; 455/436; 455/437; 455/438; 455/439; 455/440; 455/441; 455/442; 455/443; 455/444; 455/448

(58) Field of Classification Search
CPC ..... H04W 36/08; H04W 16/02; H04W 16/10; H04W 72/0453; H04W 72/1231
USPC .................. 455/436–444, 447, 448
See application file for complete search history.

(56) References Cited

U.S. PATENT DOCUMENTS

| 8,126,467 B2 * | 2/2012 | Choi et al. | 455/444 |
| 2006/0084441 A1 | 4/2006 | Dowling | |

(Continued)

FOREIGN PATENT DOCUMENTS

| EP | 2 056 628 A1 | 5/2009 |
| EP | 2056628 | 5/2009 |

(Continued)

OTHER PUBLICATIONS

International search report and written opinion issued for corresponding International Patent Application No. PCT/GB2010/001134, mailed Apr. 21, 2011.

(Continued)

*Primary Examiner* — Charles Appiah
*Assistant Examiner* — Jaime Holliday
(74) *Attorney, Agent, or Firm* — Myers Wolin, LLC (57) ABSTRACT

A method of controlling handover in wireless cellular networks of user equipment in a first cell unit which is to be disabled to a second cell unit which is to provide extended coverage for the, or part of the, first cell unit, where the cell unit of the first and second cell units is a cell or a cell sector, including selecting a part of the signal bandwidth or time-frequency resource units, previously designated for use in normal operation by the second cell unit, which does not overlap with that to be used by the first cell unit during the handover; and designating the selected part for use by the user equipment to be handed over from the first cell unit.

22 Claims, 5 Drawing Sheets

(56) References Cited

U.S. PATENT DOCUMENTS

2009/0318156 A1 12/2009 Ode et al.
2010/0110996 A1* 5/2010 Tao et al. ............... 370/329
2012/0250558 A1* 10/2012 Chung et al. ........... 370/252

FOREIGN PATENT DOCUMENTS

| | | |
|---|---|---|
| JP | 2010-035152 A | 2/2010 |
| WO | 02/07464 | 1/2002 |
| WO | 2009078764 A1 | 6/2009 |
| WO | 2009/116643 A1 | 9/2009 |

OTHER PUBLICATIONS

Office Action issued for corresponding for Japanese Patent Application No. 2013-513739, mailed on Feb. 4, 2014, with an English translation.

Huawei et al.; "Energy Saving in UTRAN"; Agenda Item: 21; 3GPP TSG-RAN WG3#65bis; R3-092342; Miyazaki, Japan; Oct. 12-15, 2009.

John S. Thompson et al.; "Smart Antenna Arrays for CDMA Systems"; IEEE Personal Communications; vol. 3, No. 5, pp. 16-25; Oct. 1996.

\* cited by examiner

HANDOVER PROCEDURES AND SIGNALLING FOR PLANNED CELL OUTAGE IN WIRELESS CELLULAR NETWORKS

CROSS REFERENCE TO RELATED APPLICATION

The present Application is a continuation of Application PCT/GB2010/001134, filed Jun. 9, 2010, now pending, the contents of which are herein wholly incorporated by reference.

The present invention relates to handover procedures and signalling for planned cell outage in wireless cellular networks.

Reducing the energy consumption of wireless cellular networks is desirable since it lowers the environmental impact from operating the network and the operational expenditure (OPEX). In a typical wireless cellular network, the energy consumption of the Base Station (BS) is the dominant contributor to the total energy consumption. Therefore, it is worthwhile exploring methods which allow the controlled disabling of one or more of the BSs/cells during times of low traffic in order to reduce the energy consumption. In this regard, energy consumption reduction in wireless networks has recently become an active research area in academia and industry and is also being considered in the 3GPP LTE-A standardization process.

When disabling one or multiple BSs, care must be taken to avoid interruption of service to User Equipment (UE) located in the coverage area of the cells to be disabled. In case of cellular overlay networks, which are characterised by the use of a hierarchical structure of BS types providing different coverage area sizes (eg. short range microcell or femtocell BS providing additional capacity in areas which are already covered by long range macrocell BSs), planned disabling of the short range BSs is simpler, since the areas covered by the short range BSs are already covered by the long range BSs. This is in contrast to the planned disabling of macrocell BSs, where coverage of the area provided by a BS to be disabled needs to be provided by one or multiple neighbouring BSs during the downtime in order to avoid interruption of the service.

US2009318156A1 discloses a method for handing over a user from a first base station using a first carrier frequency to a second base station using a second carrier frequency. The handover is triggered by a potential loss of call or call degradation.

WO2009078764A1 discloses a method and related signalling which compensates for cell outage by extending the coverage of remaining cell(s). It proposes to modify the antenna position and/or transmission power in order to partially cover a neighbouring cell which is in outage. A related signalling mechanism for the exchange of cell status information to support this procedure is also disclosed.

In US2006084441A1 it is proposed to modify the antenna radiation pattern of at least two cells neighbouring a disabled cell in order to provide coverage within the area of the disabled cell. The extended coverage is provided by modifying the antenna beam pattern, transmission power or data rate.

The 3GPP standards contribution, 3GPP R3-092342, "Energy Saving in UTRAN", October 2009, proposes to gradually decrease the transmit power of a cell to be disabled in order to allow a controlled handover of the users in the area covered by the cell to be disabled to a neighbouring cell without call interruption.

The paper by J. S. Thompson, P. M. Grant and B. Mulgrew, B., "Smart antenna arrays for CDMA systems", IEEE Personal Communications, Vol. 3., No. 5, October 1996, pp 16 to 25, discusses the use of antenna arrays at the base station to improve the system capacity and to reduce the uplink UE transmit power requirement.

It is desirable to provide improved handover techniques.

According to an embodiment of a first aspect of the present invention there is provided a method of controlling handover in wireless cellular networks of user equipment in a first cell unit which is to be disabled to a second cell unit which is to provide extended coverage for the, or part of the, first cell unit, where the cell unit of the first and second cell units is a cell or a cell sector, the method comprising the steps of: selecting a part of the signal bandwidth or time-frequency resource units, previously designated for use in normal operation by the second cell unit, which does not overlap with that to be used by the first cell unit during the handover; and designating the selected part for use by the user equipment to be handed over from the first cell unit.

The wireless cellular network may employ a multi-carrier system, in which in normal operation the first and second cell units each have a first carrier centred on a first frequency, and at least one second carrier, centred on a second frequency, the first frequency being different from the second frequency. In this case, in the steps of selecting and designating part of the signal bandwidth for use by the user equipment to be handed over from the first cell unit, the bandwidth occupied by the second carrier of the second cell unit may be so selected and designated, and the method may further comprise the steps of: handing over user equipment using the second carrier of the first cell unit to the first carrier of the first cell unit, handing over user equipment using the second carrier of the second cell unit to the first carrier of the second cell unit, and disabling the second carriers of the first and second cell units; configuring an additional carrier for the second cell unit on the same bandwidth as previously occupied by the second carrier of the second cell unit such that the range of the additional carrier extends to all or part of the first cell unit; and handing over user equipment using the first carrier of the first cell unit to the additional carrier of the second cell unit.

Alternatively, the wireless cellular network may employ a Fractional Frequency Reuse system in which the frequency reuse factor is N and a frequency reuse $n_1$ partition of the first and second cell units uses a first time-frequency resource unit, a frequency reuse $n_2$ partition of the second cell unit uses a second time-frequency resource unit, and a frequency reuse $n_2$ partition of the first cell unit uses a third time-frequency resource unit, where $1 \leq n_1 \leq N$, $1 \leq n_2 \leq N$, $n_1 \neq n_2$ and the first, second and third time-frequency resource units are different from one another. In this case, in the steps of selecting and designating part of the time-frequency resource units for use by the user equipment to be handed over from the first cell unit, the time-frequency resource unit occupied by the frequency reuse $n_2$ partition of the second cell unit may be so selected and designated, and the method may further comprise the steps of: extending the range of the frequency reuse $n_2$ partition of the second cell unit to all or part of the first cell unit; and handing over user equipment using the first cell unit to the frequency reuse $n_2$ partition of the second cell unit. If the frequency reuse $n_2$ partition of the second cell unit is to be used exclusively to provide coverage for the user equipment to be handed over from the first cell unit, user equipment using the frequency reuse $n_2$ partition of the second cell unit may be assigned to the frequency reuse $n_1$ partition of the second cell unit before extending the range of the frequency reuse $n_2$ partition of the second cell unit. If the frequency reuse factor N is 3, $n_1$ may be 1 and $n_2$ may be 3.

According to an embodiment of a second aspect of the present invention there is provided a method for use in a handover procedure in wireless cellular networks, in which handover procedure user equipment in a first cell unit which is to be disabled is handed over to a second cell unit which is to provide extended coverage for the, or part of the, first cell unit, the cell unit of the first and second cell units being a cell or a cell sector, wherein the second cell unit is selected from cell units other than the first cell unit in accordance with a selection procedure which comprises the step of: updating a handover parameter so as to trigger user equipment in the first cell unit to provide a measurement report based on the received signal strength of cell units neighbouring the said first cell unit even if the first cell unit provides the highest received signal strength. In the case of a multi-carrier system, the measurement report is an inter-frequency measurement report. In the case of an FFR system, the measurement report is an intra-frequency measurement report. If the network is a 3GPP LTE-A network, the said handover parameter may be the a3-Offset parameter set to a negative value.

According to an embodiment of a third aspect of the present invention there is provided a method for use in a handover procedure in wireless cellular networks, in which handover procedure user equipment in a first cell unit which is to be disabled is handed over to a second cell unit which is to provide extended coverage for the, or part of the, first cell unit, the cell unit of the first and second cell units being a cell or a cell sector, wherein the second cell unit is selected from cell units other than the first cell unit in accordance with a selection procedure which comprises the step of: updating a list of cell units which neighbour the first cell unit by adding to the list any newly-enabled cell units.

According to an embodiment of a fourth aspect of the present invention there is provided a method for use in a handover procedure in wireless cellular networks, in which handover procedure user equipment in a first cell unit which is to be disabled is handed over to a second cell unit which is to provide extended coverage for the, or part of the, first cell unit, the cell unit of the first and second cell units being a cell or a cell sector, wherein the second cell unit is selected from cell units other than the first cell unit in accordance with a selection procedure which comprises the steps of: updating a list of cell units which neighbour the first cell unit by adding to the list any newly-enabled cell units; and updating a handover parameter so as to trigger user equipment in the first cell unit to provide a measurement report based on the received signal strength of cell units in the said list even if the first cell unit provides the highest received signal strength. In the case of a multi-carrier system, the measurement report is an inter-frequency measurement report. In the case of an FFR system, the measurement report is an intra-frequency measurement report. If the network is a 3GPP LTE-A network, the said handover parameter may be the a3-Offset parameter set to a negative value.

According to an embodiment of a fifth aspect of the present invention there is provided a method for use in a handover procedure in wireless cellular networks, in which handover procedure user equipment in a first cell unit which is to be disabled is handed over to a second cell unit which is to provide extended coverage for the, or part of the, first cell unit, the cell unit of the first and second cell units being a cell or a cell sector, wherein the second cell unit is selected from cell units other than the first cell unit in accordance with a selection procedure which comprises the step of: broadcasting or unicasting a message to user equipment in the first cell unit which indicates whether or not any cell units have been newly-enabled, which message prompts the user equipment to provide a measurement report based on the received signal strength of neighbouring cell units including any newly-enabled neighbouring cell units but excluding the first cell unit. The message may optionally also include an indication of the time remaining before the first cell unit is due to be disabled.

According to an embodiment of a sixth aspect of the present invention there is provided a handover procedure for use in a wireless cellular network in which user equipment in a first cell unit which is to be disabled is handed over to a second cell unit which is to provide extended coverage for the, or part of the, first cell unit, where the cell unit of the first and second cell units is a cell or a cell sector, the handover procedure being controlled in accordance with a method embodying the first aspect of the present invention and employing a method embodying any one of the second to fifth aspects of the present invention.

According to an embodiment of a seventh aspect of the present invention there is provided a method of controlling handover in wireless cellular networks of user equipment in a first cell unit to a newly-enabled second cell unit, where the first cell unit provides coverage for the, or part of the, second cell unit, the cell unit of the first and second cell units being a cell or a cell sector, the method comprising the steps of: selecting a part of the signal bandwidth or time-frequency resource units, designated for use in normal operation by the second cell unit, which does not overlap with that used by the first cell unit to provide coverage for the, or the part of the, second cell unit; and designating the selected part for use by the user equipment to be handed over from the first cell unit.

The wireless cellular network may employ a multi-carrier system, in which in normal operation the first and second cell units each have a first carrier centred on a first frequency, and at least one second carrier, centred on a second frequency, the first frequency being different from the second frequency. In this case, user equipment in the area covered by the second cell unit may use the second carrier of the first cell unit and, in the steps of selecting and designating part of the signal bandwidth for use by the user equipment to be handed over from the first cell unit, the bandwidth occupied by the first carrier of the second cell unit may be so selected and designated, and the method may further comprise the steps of: handing over user equipment using the second carrier of the first cell unit to the first carrier of the second cell unit; and reducing the range of the second carrier of the first cell unit so that it does not cover any of the area of the second cell unit.

Alternatively, the wireless cellular network may employ a Fractional Frequency Reuse system in which the frequency reuse factor is N and a frequency reuse $n_1$ partition of the first and second cell units uses a first time-frequency resource unit, a frequency reuse $n_2$ partition of the second cell unit uses a second time-frequency resource unit, and a frequency reuse $n_2$ partition of the first cell unit uses a third time-frequency resource unit, where $1 \leq n_1 \leq N$, $1 \leq n_2 \leq N$, $n_1 \neq n_2$ and the first, second and third time-frequency resource units are different from one another. In this case, user equipment in the area covered by the second cell unit may use the frequency reuse $n_2$ partition of the first cell unit and, in the steps of selecting and designating part of the time-frequency resource units for use by the user equipment to be handed over from the first cell unit, the time-frequency resource unit occupied by the frequency reuse $n_2$ partition of the second cell unit may be so selected and designated, and the method may further comprise the steps of: handing over user equipment in the area covered by the second cell unit from the frequency reuse $n_2$ partition of the first cell unit to the frequency reuse $n_2$ partition of the second cell unit; and reducing the range of the frequency reuse $n_2$ partition of the first cell unit so as not to cover any of the area of the second cell unit. If the frequency reuse factor N is 3, $n_1$ may be 1 and $n_2$ may be 3.

According to an embodiment of an eighth aspect of the present invention there is provided a method for use in a handover procedure in wireless cellular networks, in which handover procedure user equipment in a first cell unit is handed over to a second cell unit, where the first cell unit provides coverage for the, or part of the, second cell unit, the cell unit of the first and second cell units being a cell or a cell sector, wherein the second cell unit is selected from cell units including newly-enabled cell units but excluding the first cell unit in accordance with a selection procedure which comprises the step of: broadcasting or unicasting a message to user equipment in the first cell unit which indicates whether or not any cell units have been newly-enabled, which message prompts the user equipment to provide a measurement report based on the received signal strength of neighbouring cell units including any newly-enabled neighbouring cell units but excluding the first cell unit. The message may optionally also include an indication of the time remaining before the first cell unit is due to be disabled.

According to an embodiment of a ninth aspect of the present invention there is provided a handover control apparatus for controlling handover in wireless cellular networks of user equipment in a first cell unit which is to be disabled to a second cell unit which is to provide extended coverage for the, or part of the, first cell unit, where the cell unit of the first and second cell units is a cell or a cell sector, the apparatus being configured to: select a part of the signal bandwidth or time-frequency resource units, previously designated for use in normal operation by the second cell unit, which does not overlap with that to be used by the first cell unit during the handover; and designate the selected part for use by the user equipment to be handed over from the first cell unit.

The apparatus may be adapted for use with a wireless cellular network configured to employ a multi-carrier system, in which in normal operation the first and second cell units each have a first carrier centred on a first frequency, and at least one second carrier, centred on a second frequency, the first frequency being different from the second frequency. In this case, the apparatus may be configured to select and designate the bandwidth occupied by the second carrier of the second cell unit for use by the user equipment to be handed over from the first cell unit, and may be further configured to cause: user equipment using the second carrier of the first cell unit to be handed over to the first carrier of the first cell unit, user equipment using the second carrier of the second cell unit to be handed over to the first carrier of the second cell unit, and the second carriers of the first and second cell units to be disabled; an additional carrier for the second cell unit to be configured on the same bandwidth as previously occupied by the second carrier of the second cell unit such that the range of the additional carrier extends to all or part of the first cell unit; and user equipment using the first carrier of the first cell unit to be handed over to the additional carrier of the second cell unit.

Alternatively, the apparatus may be adapted for use with a wireless cellular network configured to employ a Fractional Frequency Reuse system in which the frequency reuse factor is N and a frequency reuse $n_1$ partition of the first and second cell units uses a first time-frequency resource unit, a frequency reuse $n_2$ partition of the second cell unit uses a second time-frequency resource unit, and a frequency reuse $n_2$ partition of the first cell unit uses a third time-frequency resource unit, where $1 \leq n_1 \leq N$, $1 \leq n_2 \leq N$, $n_1 \neq n_2$ and the first, second and third time-frequency resource units are different from one another. The apparatus may be configured to select and designate the bandwidth occupied by the frequency reuse $n_2$ partition of the second cell unit for use by the user equipment to be handed over from the first cell unit, and further configured to cause: the range of the frequency reuse $n_2$ partition of the second cell unit to be extended to all or part of the first cell unit; and user equipment using the first cell unit to be handed over to the frequency reuse $n_2$ partition of the second cell unit. If the frequency reuse $n_2$ partition of the second cell unit is to be used exclusively to provide coverage for the user equipment to be handed over from the first cell unit, the apparatus may be configured to cause user equipment using the frequency reuse $n_2$ partition of the second cell unit to be assigned to the frequency reuse $n_1$ partition of the second cell unit before the range of the frequency reuse $n_2$ partition of the second cell unit is extended. If the frequency reuse factor N is 3, $n_1$ may be 1 and $n_2$ may be 3.

According to an embodiment of a tenth aspect of the present invention there is provided apparatus for use in carrying out a handover procedure in wireless cellular networks, in which handover procedure user equipment in a first cell unit which is to be disabled is handed over to a second cell unit which is to provide extended coverage for the, or part of the, first cell unit, the cell unit of the first and second cell units being a cell or a cell sector, wherein the apparatus is configured to carry out a selection procedure to select the second cell unit from cell units other than the first cell unit, in which selection procedure the apparatus is operable to cause a handover parameter to be updated so as to trigger user equipment in the first cell unit to provide a measurement report based on the received signal strength of cell units neighbouring the said first cell unit even if the first cell unit provides the highest received signal strength. In the case of a multi-carrier system, the measurement report is an inter-frequency measurement report. In the case of an FFR system, the measurement report is an intra-frequency measurement report. If the network is a 3GPP LTE-A network, the said handover parameter may be the a3-Offset parameter set to a negative value.

According to an embodiment of an eleventh aspect of the present invention there is provided apparatus for use in carrying out a handover procedure in wireless cellular networks, in which handover procedure user equipment in a first cell unit which is to be disabled is handed over to a second cell unit which is to provide extended coverage for the, or part of the, first cell unit, the cell unit of the first and second cell units being a cell or a cell sector, wherein the apparatus is configured to carry out a selection procedure to select the second cell unit from cell units other than the first cell unit, in which selection procedure the apparatus is operable to cause a list of cell units which neighbour the first cell unit to be updated by adding to the list any newly-enabled cell units.

According to an embodiment of a twelfth aspect of the present invention there is provided apparatus for use in carrying out a handover procedure in wireless cellular networks, in which handover procedure user equipment in a first cell unit which is to be disabled is handed over to a second cell unit which is to provide extended coverage for the, or part of the, first cell unit, the cell unit of the first and second cell units being a cell or a cell sector, wherein the apparatus is configured to carry out a selection procedure to select the second cell unit from cell units other than the first cell unit, in which selection procedure the apparatus is operable to cause: a list of cell units which neighbour the first cell unit to be updated by adding to the list any newly-enabled cell units; and a handover parameter to be updated so as to trigger user equipment in the first cell unit to provide a measurement report based on the received signal strength of cell units in the said list even if the first cell unit provides the highest received signal strength. In the case of a multi-carrier system, the measurement report is an inter-frequency measurement report. In the case of an FFR system, the measurement report is an intra-frequency measurement report. If the network is a 3GPP LTE-A network, the said handover parameter may be the a3-Offset parameter set to a negative value.

According to an embodiment of a thirteenth aspect of the present invention there is provided apparatus for use in carrying out a handover procedure in wireless cellular networks, in which handover procedure user equipment in a first cell unit which is to be disabled is handed over to a second cell unit which is to provide extended coverage for the, or part of the, first cell unit, the cell unit of the first and second cell units being a cell or a cell sector, wherein the apparatus is configured to carry out a selection procedure to select the second cell unit from cell units other than the first cell unit, in which selection procedure the apparatus is operable to cause: a message to be broadcast or unicast to user equipment in the first cell unit which indicates whether or not any cell units have been newly-enabled, which message prompts the user equipment to provide a measurement report based on the received signal strength of neighbouring cell units including any newly-enabled neighbouring cell units but excluding the first cell unit. The message may optionally also include an indication of the time remaining before the first cell unit is due to be disabled.

According to an embodiment of a fourteenth aspect of the present invention there is provided apparatus for carrying out a handover procedure in wireless cellular networks of user equipment in a first cell unit which is to be disabled to a second cell unit which is to provide extended coverage for the, or part of the, first cell unit, where the cell unit of the first and second cell units is a cell or a cell sector, the apparatus being configured in accordance with the eighth aspect of the present invention and any one of the ninth to twelfth aspects of the present invention.

According to an embodiment of a fifteenth aspect of the present invention there is provided a handover control apparatus for controlling handover in wireless cellular networks of user equipment in a first cell unit to a newly-enabled second cell unit, where the first cell unit provides coverage for the, or part of the, second cell unit, the cell unit of the first and second cell units being a cell or a cell sector, the apparatus being configured to: select a part of the signal bandwidth or time-frequency resource units, designated for use in normal operation by the second cell unit, which does not overlap with that used by the first cell unit to provide coverage for the, or the part of the, second cell unit; and designate the selected part for use by the user equipment to be handed over from the first cell unit.

The apparatus may be adapted for use with a wireless cellular network which employs a multi-carrier system, in which in normal operation the first and second cell units each have a first carrier centred on a first frequency, and at least one second carrier, centred on a second frequency, the first frequency being different from the second frequency. In this case, if user equipment in the area covered by the second cell unit is configured to use the second carrier of the first cell unit, the apparatus may be configured to select and designate the bandwidth occupied by the first carrier of the second cell unit for use by the user equipment to be handed over from the first cell unit, and may be further configured to cause: user equipment using the second carrier of the first cell unit to be handed over to the first carrier of the second cell unit; and the range of the second carrier of the first cell unit to be reduced so that it does not cover any of the area of the second cell unit.

Alternatively the apparatus may be adapted for use with a wireless cellular network which employs a Fractional Frequency Reuse system in which the frequency reuse factor is N and a frequency reuse $n_1$ partition of the first and second cell units uses a first time-frequency resource unit, a frequency reuse $n_2$ partition of the second cell unit uses a second time-frequency resource unit, and a frequency reuse $n_2$ partition of the first cell unit uses a third time-frequency resource unit, where $1 \le n_1 \le N$, $1 \le n_2 \le N$, $n_1 \ne n_2$ and the first, second and third time-frequency resource units are different from one another. In this case, if user equipment in the area covered by the second cell unit uses the frequency reuse $n_2$ partition of the first cell unit, the apparatus may be configured to select and designate the bandwidth occupied by the frequency reuse $n_2$ partition of the second cell unit for use by the user equipment to be handed over from the first cell unit, and may be further configured to cause: user equipment in the area covered by the second cell unit to be handed over from the frequency reuse $n_2$ partition of the first cell unit to the frequency reuse $n_2$ partition of the second cell unit; and the range of the frequency reuse $n_2$ partition of the first cell unit to be reduced so as not to cover any of the area of the second cell unit. If the frequency reuse factor N is 3, $n_1$ may be 1 and $n_2$ may be 3.

According to an embodiment of a sixteenth aspect of the present invention there is provided apparatus for use in carrying out a handover procedure in wireless cellular networks, in which handover procedure user equipment in a first cell unit is handed over to a second cell unit, where the first cell unit provides coverage for the, or part of the, second cell unit, the cell unit of the first and second cell units being a cell or a cell sector, wherein the apparatus is configured to carry out a selection procedure to select the second cell unit from cell units including newly-enabled cell units but excluding the first cell unit, in which selection procedure the apparatus is operable to cause:

a message to be broadcast or unicast to user equipment in the first cell unit which indicates whether or not any cell units have been newly-enabled, which message prompts the user equipment to provide a measurement report based on the received signal strength of neighbouring cell units including any newly-enabled neighbouring cell units but excluding the first cell unit.

According to an embodiment of a seventeenth aspect of the present invention there is provided a computer program which, when executed on apparatus in a wireless cellular network, causes that apparatus to carry out a method in accordance with any one of the first to fifth or seventh or eighth aspects of the present invention or a procedure in accordance with the sixth aspect of the present invention, or to become apparatus in accordance with any one of the ninth to sixteenth aspects of the present invention.

Accordingly, using a method embodying the present invention, macrocell BSs can be switched off without service interruption to UEs. This is achieved by ensuring that the UEs in the areas covered by cells to be disabled are handed over in a controlled manner to neighbouring BSs beforehand, whose coverage is extended during the downtime of the disabled cells. The same procedure, but in the reverse order, is applied when enabling macrocell BSs. It should be noted that the term macrocell BS is used here because this represents a typical application scenario, but it should be understood that the present invention may be applied to any other type of BS or BS sector (e.g. microcell, picocell or femtocell BS).

By choosing the signal bandwidth of the BS(s) providing extended coverage to be a fraction of the bandwidth used during normal operation and being non-overlapping with the signal bandwidth used during the handover interval by the BS to be disabled, no additional bandwidth is required to implement the handover.

Reference will now be made, by way of example, to the accompanying drawings, in which.

In accordance with an embodiment of the present invention a method for the controlled disabling/enabling of cells within a cellular network relies on the extension of the coverage of one or more BSs in order to provide coverage for a BS to be disabled. In order to allow a controlled handover of UEs which are in the coverage area of the BS to be disabled before switching it off, both the BS providing extended coverage and the BS to be disabled must provide adequate signal strength to those UEs during the handover time interval. However, in order to avoid interference between the two signals, the available bandwidth is split during the handover phase such that interference between the two signals can be avoided and UEs can be reliably handed over to the BS providing extended coverage. This is achieved by choosing the signal bandwidth of the BS(s) providing extended coverage to be a fraction of the bandwidth used during normal operation and being non-overlapping with the signal bandwidth used during the handover interval by the BS to be disabled. The advantage of this approach is that no additional bandwidth is required to implement the proposed method for controlled cell outage.

Two ways to split the bandwidth in order for a particular BS to provide extended coverage for a BS to be disabled will now be described with reference to practical systems. Both methods allow the control signalling (such as system configuration, resource allocation etc.) as well as the actual data allocation resource areas to have extended coverage while avoiding interference with the cell to be disabled.

Figure 1:
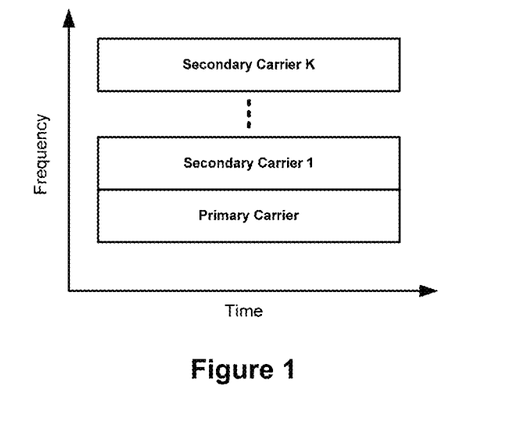
FIG. 1 illustrates a generic multi-carrier system.

The first method relies on the use of multi-carrier systems employing primary and secondary carriers during normal operation, which allows the use of the full bandwidth by all cells during normal operation. Multi-carrier systems are currently being standardized in both 3GPP LTE-A and IEEE 802.16m. FIG. 1 shows a generic multi-carrier system composed of one primary carrier and K secondary carriers, based on IEEE 802.16m terminology (IEEE 802.16m-09/0034r2, "IEEE 802.16m System Description Document (SDD)", September 2009). The primary carriers contain the full control signalling, while the secondary carriers are assumed to carry a reduced amount of control information.

The non-overlapping bandwidths required during the handover operation can be obtained by replacing the secondary carrier with an additional primary carrier in the BS which is to provide extended coverage, while the BS which is to be disabled can be disabled once all UEs have been handed over to the primary carrier providing extended coverage.

Figure 2:
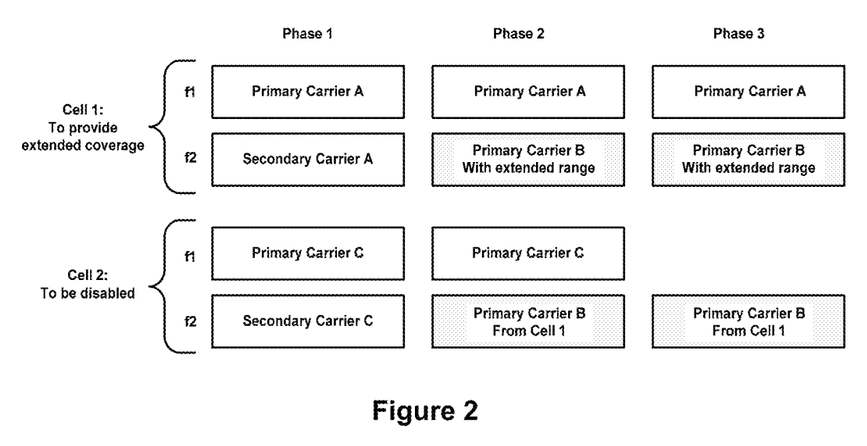
FIG. 2 illustrates a first handover procedure embodying the present invention.

Assuming that a cell 1 will provide extended coverage for part or the whole of a cell 2, which is to be disabled, and that primary carriers A and C of cells 1 and 2 are centred at frequency f1, while secondary carriers A and C of cells 1 and 2 are centred at frequency f2, the handover procedure consists of three distinct phases, as shown in FIG. 2:

1. Cells 1 and 2 hand over all their UEs from their secondary carriers A and C to their primary carriers A and C. Then, both cells 1 and 2 disable their secondary carriers A and C.
2. Cell 1 configures a new primary carrier B with extended range on the same spectrum as previously used by the secondary carrier A. Subsequently, cell 2 hands over all its UEs to the primary carrier B from cell 1.
3. Cell 2 is disabled. All UEs in the area previously served by cell 2 are now served by the primary carrier B from cell 1.

The same procedure, but in the reverse order, is used for enabling a particular cell (not shown in the Figures). In particular, assuming a cell 1 has a primary carrier A centred at frequency f1 for UEs within the normal range of cell 1 and an additional primary carrier B centred at f2 for UEs within an extended area of cell 1, and that a newly-enabled cell 2 has a primary carrier C centred at frequency f1, then the handover to the newly-enabled cell 2 comprises:

1. Cell 1 hands over UEs in the extended area of cell 1 to the primary carrier C of cell 2.
2. Cell 1 restores the additional primary carrier B to its use as the secondary carrier A of cell 1 with the normal range of cell 1.
3. Cell 2 restores its secondary carrier C.
4. Both cell 1 and cell 2 may hand over their UEs from their primary carriers to their secondary carriers.

The second method relies on the use of Fractional Frequency Reuse (FFR), which may be used in systems which do not support multi-carrier operation. FFR is a well established method for reducing cell-edge interference in wireless cellular networks. With FFR the downlink radio frame can, for example, be configured to have a frequency reuse 1 partition (which is used by each BS in the network) and a frequency reuse 3 partition (which is re-used by every third BS in the network). Cell-edge UEs which experience high inter-cell interference can then be served in the frequency reuse 3 partition, where they will experience less inter-cell interference due to increased inter-site frequency reuse distance.

Figure 3:
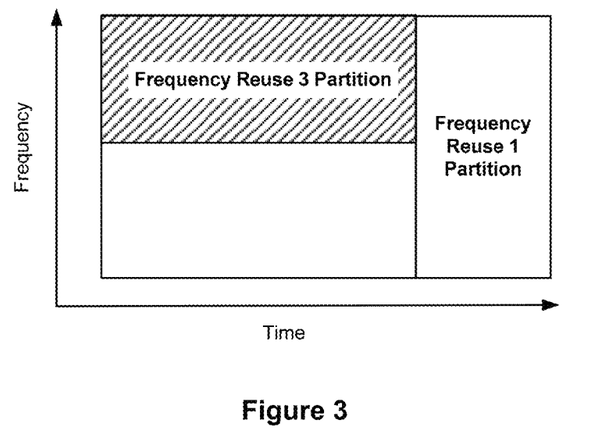
FIG. 3 illustrates an exemplary Fractional Frequency Reuse (FFR) system.

FIG. 3 shows an exemplary FFR system with a frequency reuse factor N of 3, where each BS is assigned one frequency reuse 3 partition and one frequency reuse 1 partition. It should be noted that FIG. 3 serves purely as an example and different partitioning of the available time-frequency resource units into the reuse 1 and 3 partitions may be used, for example a split along the time axis or some mixture of splitting along both the frequency and time axes. Moreover, the frequency reuse factor N need not be 3.

For the present embodiment, the non-overlapping bandwidths required during the handover operation can be obtained by using distinct frequency reuse 3 partitions for the BSs which are to provide extended coverage and the BS which is to be disabled.

Assume that a cell 1 will provide extended coverage for part or the whole of a cell 2, which is to be disabled, and that the frequency reuse 1 partitions of all cells are centred at frequency f1, while the frequency reuse 3 partition of cell 1 is centred at frequency f2 and the frequency reuse 3 partition of cell 2 is centred at frequency f3. There are two options for the use of the frequency reuse 3 partition in the cell which is to provide extended coverage, namely:

The frequency reuse 3 partition is exclusively used to provide extended coverage. In this case, all UEs in the cell which is to provide extended coverage will have to be assigned to the frequency reuse 1 partition beforehand.

The frequency reuse 3 partition is used to provide extended coverage and also to serve UEs in the cell which is to provide extended coverage. This approach is required if due to low signal quality some UEs can not be served in the frequency reuse 1 partition.

Figure 4:
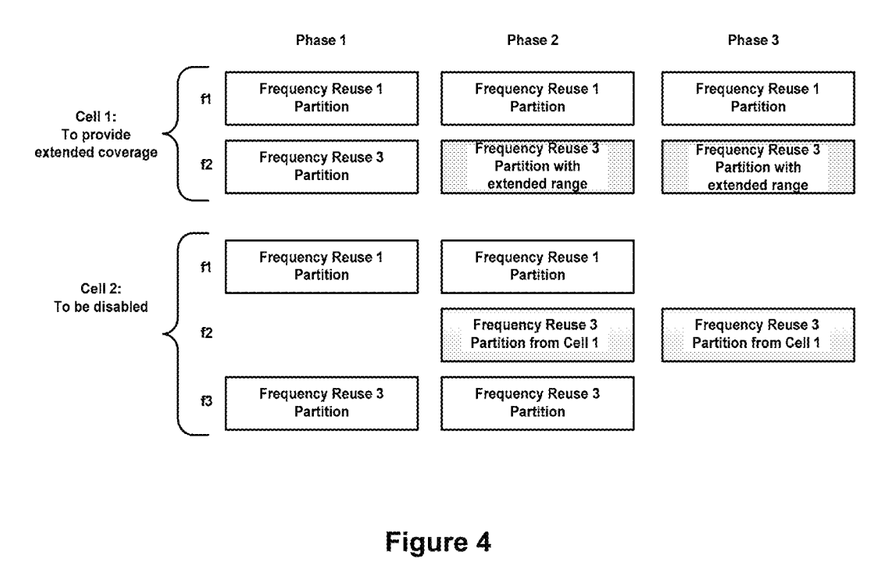
FIG. 4 illustrates a second handover procedure embodying the present invention.

The handover procedure consists of three distinct phases, as shown in FIG. 4:
1. If the frequency reuse 3 partition is exclusively used to provide extended coverage: Cell 1 assigns all its UEs from the frequency reuse 3 partition to the frequency reuse 1 partition. Otherwise: No action.
2. Cell 1 extends the range of its frequency reuse 3 partition. Subsequently, cell 2 hands over all its UEs to the frequency reuse 3 partition from cell 1.
3. Cell 2 is disabled. All UEs in the area previously served by cell 2 are now served by the frequency reuse 3 partition from cell 1.

The same procedure, but in the reverse order, is used for enabling a particular cell (not shown in the Figures). In particular, assuming a cell 1 has a frequency reuse 1 partition at frequency f1 and a frequency reuse 3 partition at a frequency f2 with extended range to cover all or part of the area covered by a newly-enabled cell 2 which has a frequency reuse 1 partition at frequency f1 and a frequency reuse 3 partition at a frequency f3, then the handover to newly-enabled cell 2 comprises:
1. Cell 1 hands over UEs in the area of extended coverage from its frequency reuse 3 partition to the frequency reuse 3 partition of cell 2.
2. Cell 1 returns the range of its frequency reuse 3 partition to its normal range.
3. Both cell 1 and cell 2 may now resume normal FFR operation and assign their UEs to their frequency reuse 1 or their frequency reuse 3 partitions.

Handover control can be carried out by the BS/cell to be disabled itself or by another BS/cell or another part of the network.

Both of the above methods allow the handover of connected (active) UEs. However, in order to preserve energy at the UE, the UE idle mode is defined in both 3GPP LTE/LTE-A and IEEE 802.16e/m standards. UEs in idle mode do not need to perform handover between individual cells, instead they only need to perform a tracking area update at tracking area boundaries, where a tracking area consists of multiple BSs/cells.

Since the mobility control of idle mode UEs is UE centric in 3GPP LTE, UEs can not be forced to handover to a neighbouring tracking area before a particular cell is disabled. Therefore, the cell which is to provide extended coverage, should belong to the same tracking area as the cell to be disabled. Otherwise, a potentially large number of idle mode UEs would start over the air signalling to update their tracking area at the same time when a cell is disabled. Similar issues may arise in other types of wireless cellular network.

Figure 5:
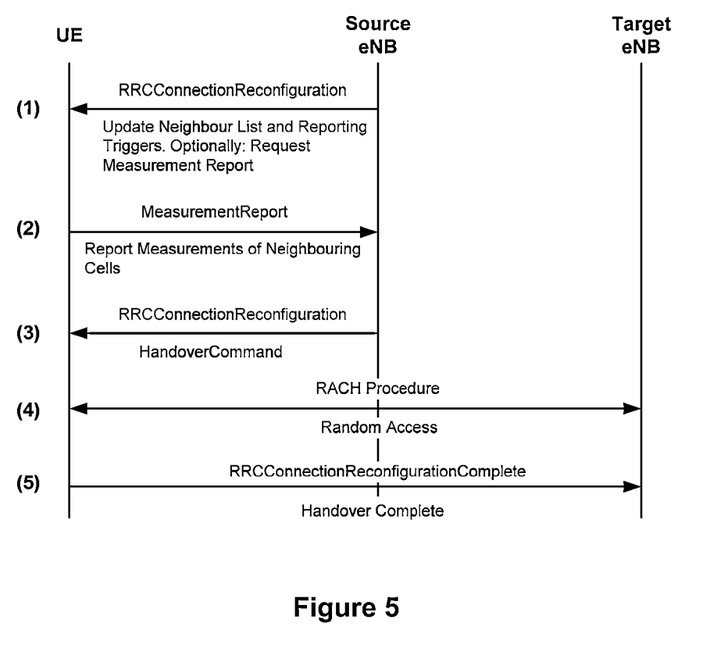
FIG. 5 illustrates a handover signalling mechanism.

A signalling mechanism for use in a handover procedure will now be described with reference to FIG. 5. In the following the signalling mechanism between the UEs, the cell to be disabled and cell(s) to provide extended coverage is described based on existing messages in a 3GPP LTE-A system; however, the same concepts apply to other wireless cellular standards. The same signalling mechanism can be used for both the multi-carrier and FFR case. FIG. 5 shows the signalling flow, where the backbone signalling among the BSs (eNBs) and network elements is not shown, since it is not part of the proposed signalling mechanism. It is assumed that the normal system specific signalling procedure is used on the backbone connection.

The five phases of the signalling for disabling a cell are as follows:
1. Update the neighbour list and UE reporting triggers using the RRCConnectionReconfiguration message.
   a. The serving (source) eNB updates the neighbour cells list by adding the cell IDs of the newly enabled cells for the multi-carrier case. When FFR is used, this is not required.
   b. The trigger values which trigger a UE MeasurementReport are updated, whereby a negative value is used for the a3-Offset to trigger a measurement report based on the received signal strength of neighbouring cells, even if the serving eNB provides the best signal strength. Alternatively, instead of updating the trigger values, the source eNB may include an unsolicited request to the UE to send a MeasurementReport.
2. The UE sends a MeasurementReport message to the serving eNB, either because it was triggered by neighbouring cell measurements or because the serving eNB sent an unsolicited request. Then the serving eNB decides on the most suitable target eNB to which the UE can be handed over.
3. The source eNB sends a HandoverCommand to the UE using the RRCConnectionReconfiguration message.
4. The UE starts the random access procedure, during which it establishes uplink synchronization with the target eNB.
5. The UE signals the completion of the handover procedure to the target eNB using the RRCConnectionReconfigurationComplete message.

In case of enabling a cell, the following actions are different compared to the above procedure: 1a. the cell to be enabled is added to the neighbour cell list in both the multi-carrier and FFR case. 1b. A positive a3-Offset is used.

That is, the five phases of the signalling for enabling a cell are as follows:
1. Update the neighbour list and UE reporting triggers using the RRCConnectionReconfiguration message.
   a. The serving (source) eNB updates the neighbour cells list by adding the cell IDs of the newly enabled cells for the multi-carrier and FFR case.
   b. The trigger values which trigger a UE MeasurementReport are updated, whereby a positive value is used for the a3-Offset to trigger a measurement report based on the received signal strength of neighbouring cells. Alternatively, instead of updating the trigger values, the source eNB may include an unsolicited request to the UE to send a MeasurementReport.
2. The UE sends a MeasurementReport message to the serving eNB, either because it was triggered by neighbouring cell measurements or because the serving eNB sent an unsolicited request. Then the serving eNB decides on the most suitable target eNB to which the UE can be handed over.
3. The source eNB sends a HandoverCommand to the UE using the RRCConnectionReconfiguration message.
4. The UE starts the random access procedure, during which it establishes uplink synchronization with the target eNB.
5. The UE signals the completion of the handover procedure to the target eNB using the RRCConnectionReconfigurationComplete message.

As an alternative to the first phase of the above-described disabling/enabling signalling mechanism, which relies on existing messages in a 3GPP LTE-A system, a specific Cell-Disable message can be broadcast or unicast, to inform the UEs that the cell is about to be disabled or enabled. By broadcasting the CellDisable message, the signalling overhead compared to using the existing unicast messages can be reduced. The CellDisable message contains at least the following information:

TABLE 1

CellDisable Message

| Content | Description |
| --- | --- |
| New neighbour cells | List of newly-enabled neighbour cell(s) |
| (Optional) Time to disabling | Length of time before cell disabled |

The CellDisable message implicitly contains the information that the serving cell is about to the disabled. Therefore, the UE behaviour upon reception of the CellDisable message should be such as to exclude the serving cell, which is to be disabled, from the measurements. The UE should then find the next best cells and report related measurements to the serving eNB in the MeasurementReport message.

In summary, methods embodying the present invention can provide a handover procedure for wireless cellular networks which allows the controlled handover of UEs from a cell to be disabled to a neighbouring cell/multiple cells which provide extended coverage for the area of the cell to be disabled, in which non-overlapping fractions of the available system bandwidth are assigned to the cell(s) which are to provide extended coverage and the cell to be disabled in order to allow a controlled handover while avoiding interference. The non-overlapping fractions of the available system bandwidth may be obtained through the use of multiple carriers or FFR, using for example the detailed handover procedure described in FIG. 2 for a multi-carrier system and in FIG. 4 for a FFR system for disabling of a cell. The same procedure, but in the reverse order, may be used for enabling a cell. Related signalling, such as summarised in FIG. 5, and in particular a new CellDisable message, as shown in Table 1, are also proposed.

A possible physical layer implementation of the above multi-carrier or FFR based handover solution is through the use of antenna beam-forming. It should be noted that the implementation discussed here serves purely as an example, and other approaches, such as remote antennas placed in cells to be disabled, could be used to provide extended coverage instead. In this example it is assumed that in normal operation mode one BS covers 3 sectors with the use of 65° beam-width directional antennas. Therefore, the discussion will be focused on disabling individual sectors, which is simply another embodiment of the concept of disabling entire BSs or cells as discussed in previous sections.

Figure 6:
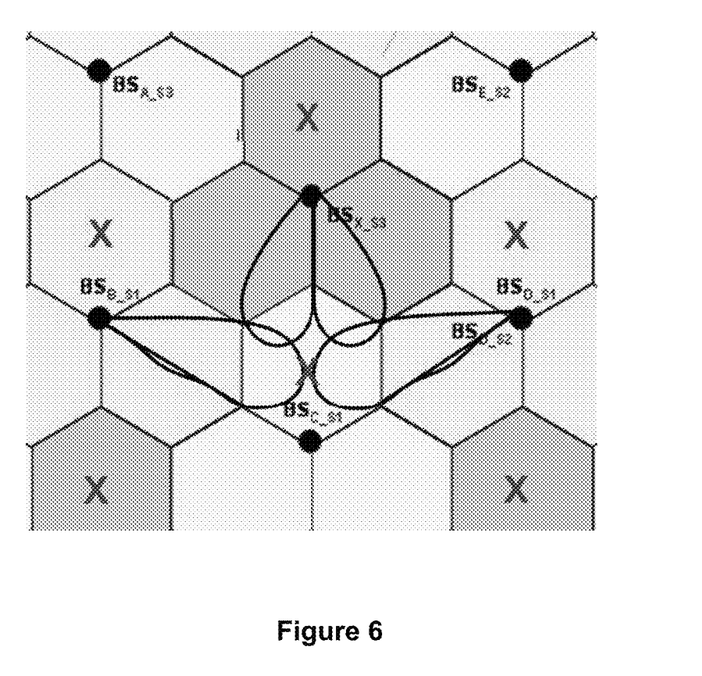
FIG. 6 is for use in explaining a physical layer implementation of a handover procedure.

When the network load is reduced to a certain level some of the sectors can be switched off and beam-forming with an antenna array from adjacent sectors can be used to cover the switched off sectors. A scenario where 1 in 3 sectors are switched off (marked with "X") and beam-forming from 4 adjacent sectors is used to cover the switched off sectors is shown in FIG. 6.

For this implementation each active sector needs to radiate two beams to cover portions of the switched off sectors, in addition to covering its own sector. Its own sector can be covered by the single antenna with the 65° beam-width and this operates in the primary carrier A or frequency reuse 1 partition, as appropriate. In this example solution, the extended beams are generated by using a 4 antenna array (of the same 65° beamwidth type) with half wavelength spacing. The extended beams are operated in the primary carrier B or frequency reuse 3 partition, as appropriate. As the two carriers/frequency partitions are orthogonal, there is no interference where the normal 65° beam pattern and the extended beam pattern overlap in the sectors to be disabled. The antenna weights for the arrays are generated with the Fourier transform based MMSE (minimum mean-squared error) antenna array synthesis approach in C. A. Balanis, "Antenna Theory—Analysis and Design", Chapter 7.4, Wiley, 1996. The desired patterns have peaks at +/−15° and +/−45° directions (depending on the sector location in the network, as shown in FIG. 6).

Figure 7A:
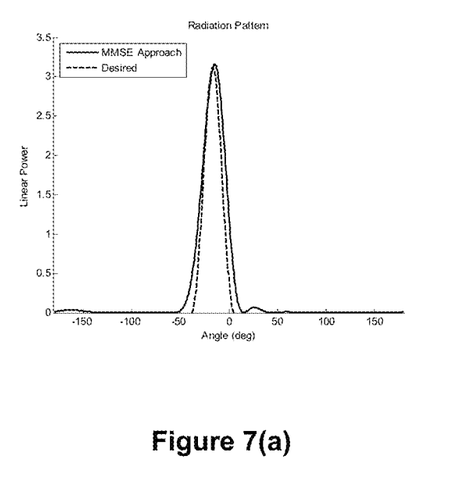
FIGS. 7(a) and 7(b) are graphs illustrating antenna pattern synthesis.
Figure 7B:
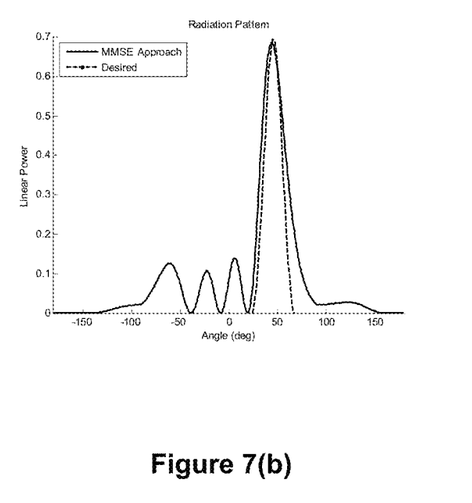

By way of example, beam patterns with peaks at −15° and +45° obtained with the MMSE approach, together with the desired beam patterns, are shown in FIGS. 7(a) and 7(b) respectively. It can be observed that the resulting beam pattern matches the desired one well. It can therefore be concluded that such a beamforming based solution to provide coverage for disabled cells is achievable using an antenna array with 4 elements.

In FIGS. 7(a) and 7(b) the linear power shown on the y-axis corresponds to the linear transmit power normalized by the linear transmit power required to cover one sector with a 65° beamwidth type antenna. As per FIG. 6, the peak at 15° should cover 1.39 times the cell radius and the peak at 45° should cover 0.9 times the cell radius. Assuming a dense urban deployment with path loss exponent 3.5, these additional coverage beams require 5 dB and −1.6 dB power over the peak of the single antenna pattern. In linear terms, these translate to 3.16 times (for the 15° peak) and 0.69 times (for the 45° peak) the power of the single main beam. As shown in FIGS. 7(a) and 7(b), these power levels are achieved in the MMSE beam-forming method at the required azimuth angle.

Assuming a multi-carrier system or an FFR system where the frequency reuse 3 partition is only used to provide extended coverage, then in order to produce the two beams needed to provide coverage of neighbouring cells requires a normalized transmit power of 1.57. This is higher than the normalized transmit power of 1.0 used during normal operation with a 65° beamwidth type antenna to cover one sector. However, this higher transmit power is only required for the carrier or frequency partition providing extended coverage. Therefore the overall normalized transmit power P of a BS providing extended coverage will be in the range 1<P<1.57, depending on the bandwidth fraction assigned to the carrier or frequency partition providing extended coverage.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

The Embodiments may also be embodied as one or more device or apparatus programs (e.g. computer programs and computer program products) for carrying out part or all of the methods described herein. Such programs Embodiments may be stored on tangible or non-transitory computer-readable media, or could, for example, be in the form of one or more signals. Such signals may be data signals downloadable from an Internet website, or provided on a carrier signal, or in any other form.

Various aspects of the present invention have been described with reference to networks in accordance with 3GPP LTE-A and/or IEEE 802.16m, but embodiments of the present invention may be applied to arrangements other than those described here.

In addition, although described separately, each of the different aspects of the invention may be combined with any other aspect, as appropriate.

What is claimed is:

1. A method of controlling handover in wireless cellular networks of user equipment in a first cell unit which is to be disabled to a second cell unit which is to provide extended coverage for the, or part of the, first cell unit, where the cell unit of the first and second cell units is a cell or a cell sector, the method comprising:

selecting a part of the signal bandwidth or time-frequency resource units, previously designated for use in normal operation by the second cell unit, which does not overlap with that to be used by the first cell unit during the handover; and designating the selected part for use by the user equipment to be handed over from the first cell unit;

wherein the wireless cellular network employs a multi-carrier system, in which in normal operation the first and second cell units each have a first carrier centered on a first frequency, and at least one second carrier, centered on a second frequency, the first frequency being different from the second frequency, and in the selecting and designating part of the signal bandwidth for use by the user equipment to be handed over from the first cell unit, the bandwidth occupied by the second carrier of the second cell unit is so selected and designated, the method further comprising:

handing over user equipment using the second carrier of the first cell unit to the first carrier of the first cell unit, handing over user equipment using the second carrier of the second cell unit to the first carrier of the second cell unit, and disabling the second carriers of the first and second cell units;

configuring an additional carrier for the second cell unit on the same bandwidth as previously occupied by the second carrier of the second cell unit such that the range of the additional carrier extends to all or part of the first cell unit; and handing over user equipment using the first carrier of the first cell unit to the additional carrier of the second cell unit.

2. A non-transitory computer-readable medium embodying a computer program which, when executed on apparatus in a wireless cellular network, causes that apparatus to carry out a method as claimed in claim 1.

3. A method of controlling handover in wireless cellular networks of user equipment in a first cell unit which is to be disabled to a second cell unit which is to provide extended coverage for the, or part of the, first cell unit, where the cell unit of the first and second cell units is a cell or a cell sector, the method comprising:

selecting a part of the signal bandwidth or time-frequency resource units, previously designated for use in normal operation by the second cell unit, which does not overlap with that to be used by the first cell unit during the handover; and designating the selected part for use by the user equipment to be handed over from the first cell unit;

wherein the wireless cellular network employs a Fractional Frequency Reuse system in which the frequency reuse factor is N and a frequency reuse $n_1$ partition of the first and second cell units uses a first time-frequency resource unit, a frequency reuse $n_2$ partition of the second cell unit uses a second time-frequency resource unit, and a frequency reuse $n_2$ partition of the first cell unit uses a third time-frequency resource unit, where $1 \leq n_1 \leq N$, $1 \leq n_2 \leq N$, $n_1 \neq n_2$ and the first, second and third time-frequency resource units are different from one another, and in the selecting and designating part of the time-frequency resource units for use by the user equipment to be handed over from the first cell unit, the time-frequency resource unit occupied by the frequency reuse $n_2$ partition of the second cell unit is so selected and designated, and the method further comprising:

extending the range of the frequency reuse $n_2$ partition of the second cell unit to all or part of the first cell unit; and handing over user equipment using the first cell unit to the frequency reuse $n_2$ partition of the second cell unit.

4. A method as claimed in claim 3, wherein, when the frequency reuse $n_2$ partition of the second cell unit is to be used exclusively to provide coverage for the user equipment to be handed over from the first cell unit, user equipment using the frequency reuse $n_2$ partition of the second cell unit is assigned to the frequency reuse $n_1$ partition of the second cell unit before extending the range of the frequency reuse $n_2$ partition of the second cell unit.

5. A method as claimed in claim 3, wherein the frequency reuse factor N is 3, $n_1$ is 1 and $n_2$ is 3.

6. A non-transitory computer-readable medium embodying a computer program which, when executed on apparatus in a wireless cellular network, causes that apparatus to carry out a method as claimed in claim 3.

7. A method of controlling handover in wireless cellular networks of user equipment in a first cell unit to a newly-enabled second cell unit, where the first cell unit provides coverage for the, or part of the, second cell unit, the cell unit of the first and second cell units being a cell or a cell sector, the method comprising:

selecting a part of the signal bandwidth or time-frequency resource units, designated for use in normal operation by the second cell unit, which does not overlap with that used by the first cell unit to provide coverage for the, or the part of the, second cell unit; and designating the selected part for use by the user equipment to be handed over from the first cell unit, wherein the wireless cellular network employs a multi-carrier system, in which in normal operation the first and second cell units each have a first carrier centered on a first frequency, and at least one second carrier, centered on a second frequency, the first frequency being different from the second frequency, and user equipment in the area covered by the second cell unit uses the second carrier of the first cell unit and, in the selecting and designating part of the signal bandwidth for use by the user equipment to be handed over from the first cell unit, the bandwidth occupied by the first carrier of the second cell unit is so selected and designated, the method further comprising:

handing over user equipment using the second carrier of the first cell unit to the first carrier of the second cell unit; and reducing the range of the second carrier of the first cell unit so that it does not cover any of the area of the second cell unit.

8. A non-transitory computer-readable medium embodying a computer program which, when executed on apparatus in a wireless cellular network, causes that apparatus to carry out a method as claimed in claim 7.

9. A method of controlling handover in wireless cellular networks of user equipment in a first cell unit to a newly-enabled second cell unit, where the first cell unit provides coverage for the, or part of the, second cell unit, the cell unit of the first and second cell units being a cell or a cell sector, the method comprising:

selecting a part of the signal bandwidth or time-frequency resource units, designated for use in normal operation by the second cell unit, which does not overlap with that used by the first cell unit to provide coverage for the, or the part of the, second cell unit; and designating the selected part for use by the user equipment to be handed over from the first cell unit, wherein the wireless cellular network employs a Fractional Frequency Reuse system in which the frequency reuse factor is N and a frequency reuse $n_1$ partition of the first and second cell units uses a first time-frequency resource unit, a frequency reuse $n_2$ partition of the second cell unit uses a second time-frequency resource unit, and a frequency reuse $n_2$ partition of the first cell unit uses a third time-frequency resource unit, where $1 \leq n_1 \leq N$, $1 \leq n_2 \leq N$, $n_1 \neq n_2$ and the first, second and third time-frequency resource units are different from one another, and user equipment in the area covered by the second cell unit uses the frequency reuse $n_2$ partition of the first cell unit and in the selectins and designating part of the time-frequency resource units for use by the user equipment to be handed over from the first cell unit, the time-frequency resource unit occupied by the frequency reuse $n_2$ partition of the second cell unit is so selected and designated, the method further comprising:

handing over user equipment in the area covered by the second cell unit from the frequency reuse $n_2$ partition of the first cell unit to the frequency reuse $n_2$ partition of the second cell unit; and reducing the range of the frequency reuse $n_2$ partition of the first cell unit so as not to cover any of the area of the second cell unit.

10. A method as claimed in claim 9, wherein the frequency reuse factor N is 3, $n_1$ is 1 and $n_2$ is 3.

11. A non-transitory computer-readable medium embodying a computer program which, when executed on apparatus in a wireless cellular network, causes that apparatus to carry out a method as claimed in claim 9.

12. Handover control apparatus for controlling handover in wireless cellular networks of user equipment in a first cell unit which is to be disabled to a second cell unit which is to provide extended coverage for the, or part of the, first cell unit, where the cell unit of the first and second cell units is a cell or a cell sector, the apparatus being configured to:

select a part of the signal bandwidth or time-frequency resource units, previously designated for use in normal operation by the second cell unit, which does not overlap with that to be used by the first cell unit during the handover; and designate the selected part for use by the user equipment to be handed over from the first cell unit, wherein the apparatus is adapted for use with a wireless cellular network configured to employ a multi-carrier system, in which in normal operation the first and second cell units each have a first carrier centered on a first frequency, and at least one second carrier, centered on a second frequency, the first frequency being different from the second frequency, and is configured to select and designate the bandwidth occupied by the second carrier of the second cell unit for use by the user equipment to be handed over from the first cell unit, the apparatus being further configured to cause:

user equipment using the second carrier of the first cell unit to be handed over to the first carrier of the first cell unit, user equipment using the second carrier of the second cell unit to be handed over to the first carrier of the second cell unit, and the second carriers of the first and second cell units to be disabled;

an additional carrier for the second cell unit to be configured on the same bandwidth as previously occupied by the second carrier of the second cell unit such that the range of the additional carrier extends to all or part of the first cell unit; and user equipment using the first carrier of the first cell unit to be handed over to the additional carrier of the second cell unit.

13. A communication system comprising a plurality of base stations in a wireless cellular network and handover control apparatus configured to control handover in the wireless cellular network, the handover control apparatus being apparatus as claimed in claim 12.

14. Handover control apparatus for controlling handover in wireless cellular networks of user equipment in a first cell unit which is to be disabled to a second cell unit which is to provide extended coverage for the, or part of the, first cell unit, where the cell unit of the first and second cell units is a cell or a cell sector, the apparatus being configured to:

select a part of the signal bandwidth or time-frequency resource units, previously designated for use in normal operation by the second cell unit, which does not overlap with that to be used by the first cell unit during the handover; and designate the selected part for use by the user equipment to be handed over from the first cell unit, wherein the apparatus is adapted for use with a wireless cellular network configured to employ a Fractional Frequency Reuse system in which the frequency reuse factor is N and a frequency reuse $n_1$ partition of the first and second cell units uses a first time-frequency resource unit, a frequency reuse $n_2$ partition of the second cell unit uses a second time-frequency resource unit, and a frequency reuse $n_2$ partition of the first cell unit uses a third time-frequency resource unit, where $1 \leq n_1 \leq N$, $1 \leq n_2 N$, $n_1 \neq n_2$ and the first, second and third time-frequency resource units are different from one another, and the apparatus is configured to select and designate the bandwidth occupied by the frequency reuse $n_2$ partition of the second cell unit for use by the user equipment to be handed over from the first cell unit, the apparatus being further configured to cause:

the range of the frequency reuse $n_2$ partition of the second cell unit to be extended to all or part of the first cell unit; and user equipment using the first cell unit to be handed over to the frequency reuse $n_2$ partition of the second cell unit.

15. Apparatus as claimed in claim 14, wherein, when the frequency reuse $n_2$ partition of the second cell unit is to be used exclusively to provide coverage for the user equipment to be handed over from the first cell unit, the apparatus is configured to cause user equipment using the frequency reuse $n_2$ partition of the second cell unit to be assigned to the frequency reuse $n_1$ partition of the second cell unit before the range of the frequency reuse $n_2$ partition of the second cell unit is extended.

16. Apparatus as claimed in claim 14, wherein the frequency reuse factor N is 3, $n_1$ is 1 and $n_2$ is 3.

17. A communication system comprising a plurality of base stations in a wireless cellular network and handover control apparatus configured to control handover in the wireless cellular network, the handover control apparatus being apparatus as claimed in claim 14.

18. Handover control apparatus for controlling handover in wireless cellular networks of user equipment in a first cell unit to a newly-enabled second cell unit, where the first cell unit provides coverage for the, or part of the, second cell unit, the cell unit of the first and second cell units being a cell or a cell sector, the apparatus being configured to:
  select a part of the signal bandwidth or time-frequency resources units, designated for use in normal operation by the second cell unit, which does not overlap with that used by the first cell unit to provide coverage for the, or the part of the, second cell unit; and
  designate the selected part for use by the user equipment to be handed over from the first cell unit,
  wherein the apparatus is adapted for use with a wireless cellular network which employs a multi-carrier system, in which in normal operation the first and second cell units each have a first carrier centered on a first frequency, and at least one second carrier, centered on a second frequency, the first frequency being different from the second frequency, and
  when user equipment in the area covered by the second cell unit is configured to use the second carrier of the first cell unit, the apparatus is configured to select and designate the bandwidth occupied by the first carrier of the second cell unit for use by the user equipment to be handed over from the first cell unit, and is further configured to cause:
  user equipment using the second carrier of the first cell unit to be handed over to the first carrier of the second cell unit; and
  the range of the second carrier of the first cell unit to be reduced so that it does not cover any of the area of the second cell unit.

19. A communication system comprising a plurality of base stations in a wireless cellular network and handover control apparatus configured to control handover in the wireless cellular network, the handover control apparatus being apparatus as claimed in claim 18.

20. Handover control apparatus for controlling handover in wireless cellular networks of user equipment in a first cell unit to a newly-enabled second cell unit, where the first cell unit provides coverage for the, or part of the, second cell unit, the cell unit of the first and second cell units being a cell or a cell sector, the apparatus being configured to:
  select a part of the signal bandwidth or time-frequency resources units, designated for use in normal operation by the second cell unit, which does not overlap with that used by the first cell unit to provide coverage for the, or the part of the, second cell unit; and
  designate the selected part for use by the user equipment to be handed over from the first cell unit,
  wherein the apparatus is adapted for use with a wireless cellular network which employs a Fractional Frequency Reuse system in which the frequency reuse factor is N and a frequency reuse $n_1$ partition of the first and second cell units uses a first time-frequency resource unit, a frequency reuse $n_2$ partition of the second cell unit uses a second time-frequency resource unit, and a frequency reuse $n_2$ partition of the first cell unit uses a third time-frequency resource unit, where $1 \leq n_1 \leq N$, $1 \leq n_2 \leq N$, $n_1 \neq n_2$ and the first, second and third time-frequency resource units are different from one another, and
  when user equipment in the area covered by the second cell unit uses the frequency reuse $n_2$ partition of the first cell unit, the apparatus is configured to select and designate the bandwidth occupied by the frequency reuse $n_2$ partition of the second cell unit for use by the user equipment to be handed over from the first cell unit, and is further configured to cause:
  user equipment in the area covered by the second cell unit to be handed over from the frequency reuse $n_2$ partition of the first cell unit to the frequency reuse $n_2$ partition of the second cell unit; and
  the range of the frequency reuse $n_2$ partition of the first cell unit to be reduced so as not to cover any of the area of the second cell unit.

21. Apparatus as claimed in claim 20, wherein the frequency reuse factor N is 3, $n_1$ is 1 and $n_2$ is 3.

22. A communication system comprising a plurality of base stations in a wireless cellular network and handover control apparatus configured to control handover in the wireless cellular network, the handover control apparatus being apparatus as claimed in claim 20.

* * * * *